July 29, 1969     W. RITTER     3,458,264
WRITING IMPLEMENT
Filed March 23, 1967
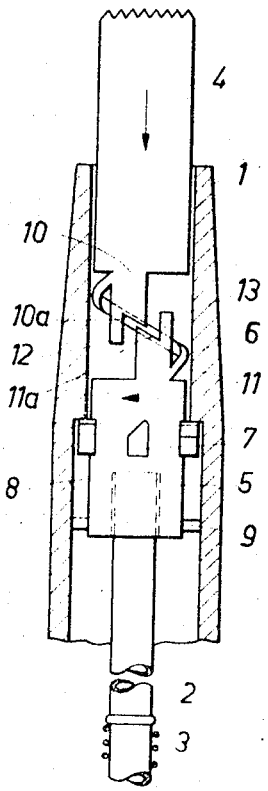
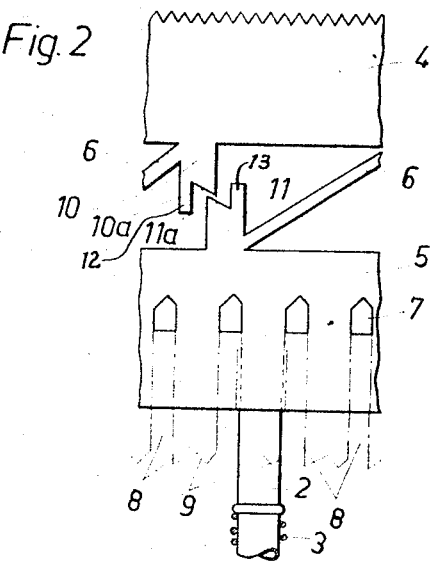
Inventor:
Wilhelm Ritter,
By Manuele Bierman,
His Attorneys United States Patent Office 3,458,264
Patented July 29, 1969

3,458,264
WRITING IMPLEMENT
Wilhelm Ritter, Brensbach, Odenwald, Germany, assignor to Jacob Ritter KG, Brensbach, Odenwald, Germany
Filed Mar. 23, 1967, Ser. No. 625,503
Claims priority, application Germany, Mar. 30, 1966, R 42,958
Int. Cl. B43k 5/16, 24/02
U.S. Cl. 401—111      2 Claims

ABSTRACT OF THE DISCLOSURE

An improvement in writing implements, particularly ball point pens, provided with a spring loaded cartridge, a pressure pin for the adjustment of the cartridge, and a connecting member. The improvement consists of at least one pair of ratchet teeth with sloping sides and a slight overlap of the sides and with stop pins at the lower end of those sides. This pair of teeth provides the link between the pressure pin and the connecting member and prevents undue turning of the pressure pin as well as excessive load of the spring, thus extending the working life of the implement.

---

Applicant's U.S. Patent 3,288,114 discloses a writing implement, particularly a ball point pen, having a longitudinally adjustable, spring-loaded cartridge wherein, for the adjustment of the filler, a pressure pin is provided and a rotatable connecting member which directly acts on the cartridge. The members has a sloping upper surface desgned to engage alternatively in long and short axial recesses in the casing which then is released from these recesses when the pressure pin is actuated and engages in the next recess upon a short rotary motion of the member under the influence of the spring. In this device, the pressure pin and the member coact by means of an elastic intermediate member, for instance, by bent supports disposed off-center, proceeding obliquely or spirally, or by oblique supports having flexural linkages on both ends.

In writing implements as described, an overly strong cartridge spring may exert forces on the member and thus on the bent supports which are in excess of the normal forces. This is deleterious to the working life of these supports. Another undue influence on the working life of these supports is due to the fact that the pressure pin is not protected against deliberate turns or twists.

It is the object of this invention to avert these drawbacks. In this invention, at least one pair of ratchet teeth is disposed between the pressure pin and the connecting member. These pairs have sides which bevel in parallel relative to each other; the teeth slightly overlap at the tip of these sides, and are provided at the lower end of the sloping side or sides, respectively, with a stop which limits the rotary motion of the connecting member. This considerably aids in the action of the bent support or supports while simultaneously lowering the pressure. The mutual support of the tooth sides effects, on one hand, a limitation of the approach motion between connecting member and pressure pin so that an excessive bending of the supports under the influence of the cartridge spring is largely avoided; and, on the other hand, the tooth sides glide along each other after release of the cans from the recesses, also under the influence of the spring and while the connecting member turns.

The stops for limiting the rotatory movement of the connecting member advantageously are in the form of pins which are of such a length that they slightly overlap when the pressure pin is not under load. The stopping action in this embodiment occurs by a lateral stroke of the ratchet teeth on the stopping pin. Simultaneously, protection against turns of the pressure pin is assured, effected toward one side by the stroke of the teeth against the stopping pin and toward the other side by backing of the bent support on the inner wall of the casing.

The invention now will be further explained with reference to the accompanying drawing. However, it should be understood that this relates to preferred embodiments and is given merely by way of illustration, and not of limitation, and that changes may be made in the details without departing from the spirit and the scope of the invention as hereinafter claimed.

In the drawing,

FIG. 1 is an elevation, partly in section, of a writing tool according to the invention; and FIG. 2 is a fragmentary plan view, showing a developed connecting unit located in the center portion of FIG. 1.

Referring now to this drawing, the casing 1 contains, inter alia, the cartridge 2 and the cartridge spring 3. The adjusting mechanism consists essentially of the pressure pin 4, connecting member 5 and an elastic connecting link 6, for instance a curved bent support. The latter is disposed off center relative to the axis of the pressure pin 4. The pressure pin, the connecting member and the elastic link are a single unit which, e.g., can be manufactured by injection molding of a suitable plastic. The adjusting mechanism furthermore includes cams 1, slipping upwardly, and a plurality of recesses 8 and 9 within casing 1. 8 and 9 serve as arresting catches.

The ratchet teeth 10 and 11 have sides 10a and 11a, respectively, which bevel in parallel relative to each other and whose tips slightly overlap. In the drawing, one pair of teeth and one bent support are shown; however, two or more pairs of teeth and/or supports may be present.

The beveling surfaces 10a and 11a are limited by stopping pins 12 and 13 which slightly overlap with the opposite ratchet tooth when pressure pin 4 is not under load. Hence, an overlap then exists between ratchet tooth 10 and pin 13 and between tooth 11 and pin 12. This not only limits the vertical movement of the ratchet teeth relative to each other, but also prevents turning of the pressure pin when not under load toward one side, while rotation of the pressure pin toward the other side is precluded by the backing of the support 6 against the inner wall of casing 1.

The mechanism as shown in the drawing operates as follows:

Upon actuation of pressure pin 4 in the direction of the arrow, ratchet teeth 10 and 11 touch down upon each other with their overlapping sides 10a and 11a, whereupon the connecting member 5 is taken along in the vertical movement of the pressure pin. Due to the position of cams 7 in recesses 8, no turning of 5 occurs, i.e., the pressure pin 4 and connecting member 5 commonly are moved downwardly for the distance determined by the ratchet teeth 10 and 11. Excessive bending and, hence, an overload of support 6 thereby is precluded.

After release of cams 7 from the recesses 8 the member 5 can freely turn which has the effect that the tooth sides 10a and 11a slide away from each other under the action of the pressure against spring 3, and member 5 turns, relative to the pressure pin, in the direction indicated by the arrow until the teeth 10 and 11 meet stops 12 and 13 whereby the turning movement of member 5 and thus the mutual axial movement between pressure pin 4 and member 5 are limited. In this position, cams 7 are disposed in the neighboring recesses 9.

After the release of the pressure on pressure pin 4, the connecting member 5 is pressed upwardly under the action of spring 3, and the cams 7 engage in the next recesses 9, i.e., in the arresting catches, which provide the writing position of cartridge 2, while the pressure pin is set into its original distance from connecting member 5 by the elastic link 6.

Upon renewed pressure action, the same operation occurs, however, with the difference that cams 7 are conducted into the arresting catches 8, thus cartridge 2 is in resting or retracted position.

I claim as my invention:

1. In a writing implement comprising a casing, a spring-loaded cartridge disposed therein, means for extension of said cartridge through the lower end of said casing and for retraction in the opposite direction comprising a pressure pin inserted from the top of said casing, at least one connecting member between said pin and said cartridge, an elastic connecting link interconnecting said pressure pin and connecting member for shifting driving of said connecting member by said pressure pin, a plurality of recesses disposed along the sides of said casing, and cam means engaging in said recesses to hold said cartridge in extended and retracted position, respectively, the improvements which comprise at least one pair of mutually opposing interengageable ratchet teeth formed on said pressure pin and respectively said connecting member; said ratchet teeth being provided with sides which slope in parallel relative to each other and slightly overlap at the tip of said sides; and each provided with stopping means at the lower end of said sloping sides, said stopping means upon abutting the opposite tooth preventing turning of said connecting member.

2. The writing implement as defined in claim 1, wherein said stopping means are stop pins which slightly overlap the corresponding opposite tooth when said cartridge is in retracted position.

References Cited

UNITED STATES PATENTS

| 3,064,624 | 11/1962 | Hechtle | 401—110 |
| 3,298,357 | 1/1967 | Bross | 401—110 |

FOREIGN PATENTS

| 1,414,580 | 9/1965 | France. |
| 1,248,510 | 8/1967 | Germany. |

LAWRENCE CHARLES, Primary Examiner